(12) United States Patent
Nam et al.

(10) Patent No.: US 7,372,618 B2
(45) Date of Patent: May 13, 2008

(54) METHOD OF MANUFACTURING MICROMIRROR ARRAY AND METHOD OF MANUFACTURING OPTICAL DEVICE HAVING MICROMIRROR

(75) Inventors: Yun-woo Nam, Yongin-si (KR); Hoo-san Lee, Osan-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 264 days.

(21) Appl. No.: 11/353,964

(22) Filed: Feb. 15, 2006

(65) Prior Publication Data

US 2006/0181762 A1   Aug. 17, 2006

(30) Foreign Application Priority Data

Feb. 15, 2005   (KR) ...................... 10-2005-0012425

(51) Int. Cl.
*G02B 26/00* (2006.01)
(52) U.S. Cl. ........................ 359/291; 359/290
(58) Field of Classification Search ................ 359/290, 359/291, 223, 224, 238, 295, 292, 297
See application file for complete search history.

(56) References Cited

U.S. PATENT DOCUMENTS

2001/0048548 A1   12/2001   Yee

FOREIGN PATENT DOCUMENTS

EP   1 475 792 A2   11/2004

*Primary Examiner*—Timothy Thompson
(74) *Attorney, Agent, or Firm*—Sughrue Mion, PLLC

(57) ABSTRACT

A method of manufacturing a micromirror array and a method of manufacturing an optical device having a micromirror. The method of manufacturing a micromirror array includes forming an adhesion layer on a substrate and a magnetic layer on the adhesion layer, patterning the adhesion layer and magnetic layer, magnetizing the magnetic layer and forming a bonding layer on each side of the adhesion layer and the magnetic layer. The substrate is severed into units, each unit including the adhesion layer, the magnetic layer, and the bonding layer. A mirror surface is formed on a side of the substrate to form a unit micromirror structure. The unit micromirror structure is then placed in a holder to form a micromirror array.

11 Claims, 8 Drawing Sheets

METHOD OF MANUFACTURING MICROMIRROR ARRAY AND METHOD OF MANUFACTURING OPTICAL DEVICE HAVING MICROMIRROR

BACKGROUND OF THE INVENTION

This application claims the priority of Korean Patent Application No. 10-2005-0012425, filed on Feb. 15, 2005, in the Korean Intellectual Property Office, the disclosure of which is incorporated herein in its entirety by reference.

1. Field of the Invention

The present invention relates to a method of manufacturing an optical device having a micromirror and, more particularly, to a method of manufacturing an optical device having a micromirror in which a micromirror widely used as an ultra-small optical component can be manufactured with high precision.

2. Description of the Related Art

Micromirrors are optical elements that have been widely used in optical pickup devices, optical communication systems and the like. Optical information storage devices having an optical pickup can record and reproduce information on and from an optical disc.

The optical information storage devices have been developed to reduce a wavelength of a light source and to increase a numerical aperture (NA) of an objective lens so that a high recording density can be achieved using optical energy. For example, optical information storage devices for CDs employ a light source having a wavelength of 780 nm and an objective lens having a numerical aperture (NA) of 0.45, and optical information storage devices for DVDs employ a light source having a wavelength of 650 nm and an objective lens having a NA of 0.6.

As users want to employ an optical disc in a portable information device, ultra-small optical pickups have been briskly developed. Optical pickups have been tried to be manufactured using semiconductor processes. In conventional optical pickup manufacturing processes, it takes a long time to adjust an optical axis between optical components when the optical components in units of several millimeters are assembled, and an automation rate is reduced. However, optical pickups can be manufactured at a wafer level using semiconductor processes so that mass-production is possible, small-sized optical pickups can be made and assembling and adjustment can be easily performed.

FIGS. 1A through 1E illustrate a conventional method of manufacturing a micromirror using semiconductor processes.

Referring to FIGS. 1A and 1B, a silicon ingot is cut to have a 9.74-degree off-axis angle with respect to a direction [011] of a plane (100) so as to form a silicon wafer 10 to a thickness of 500 μm. Referring to FIG. 1B, etching mask layers 11 and 12 are formed as SiO2 or SiNx on sides of the silicon wafer 10.

Referring to FIG. 1C, an etching window 13 is formed at a portion of the etching mask layer 11 using a photolithography process.

Referring to FIG. 1D, the silicon wafer 10 in which the etching window 13 is formed is soaked in a silicon anisotropic etching solution such as KOH or TMAH maintained at an appropriate temperature, thereby performing wet etching. When wet etching is performed for a predetermined amount of time, as shown in FIG. 1D, a first surface 15a having an inclined angle of about 45 degrees with respect to a lower surface of the silicon wafer 10 and a second surface 15b having an inclined angle of about 64.48 degrees with respect to the lower surface of the silicon wafer 10 are formed. Reference numeral 14 denotes an etched region of the silicon wafer 10.

Referring to FIG. 1E, the etching mask layers 11 and 12 are removed and the silicon wafer 10 is cut so that the first surface 15a and the second surface 15b are used as a micromirror.

The micromirror can be manufactured at a wafer level, and when a light source having a long wavelength is used or an etching depth is small, surface precision can be achieved. However, in the conventional method of manufacturing a micromirror shown in FIGS. 1A through 1E, when an etching depth is hundreds of μms, surface shaping precision cannot be easily substituted with shaping precision required in conventional optical components for optical pickups. For example, when the micromirror is used in the optical pickup, a micromirror array is manufactured and then is diced so that cracks occur in the micromirror array. When a process of bonding the micromirror array to a photodiode (PD) array is performed, the mirrormirror can be easily destroyed.

In the conventional method of manufacturing a large-sized micromirror having an array shape using an etching process, a large-sized Si wafer having high purity is used, experimental conditions should be strictly managed and a time required for etching a wafer is about 8 to 10 hours, which causes the cost of manufacturing the micromirror to increase.

SUMMARY OF THE INVENTION

The present invention provides a micromirror array in which a process of manufacturing a micromirror and a photolithography process of forming a bonding layer at a wafer level are simply performed, a separate micromirror is precisely disposed in a desired location and is precisely and stably bonded to other components, and a method of manufacturing an optical device having a micromirror.

According to an aspect of the present invention, there is provided a method of manufacturing a micromirror array, the method including: forming an adhesion layer on a substrate and a magnetic layer on the adhesion layer; patterning the adhesion layer and magnetic layer; magnetizing the magnetic layer; forming a bonding layer on each side of the adhesion layer and the magnetic layer; severing the substrate into each unit including the adhesion layer, the magnetic layer, and the bonding layer.

The substrate may be an Si substrate or a glass substrate.

The adhesion layer may include at least one material among Ta, Cr, Ru, Ti, and Pt.

The magnetic layer may include at least one material among CoSm, CoPt, NdFeB, NiFe or FePt.

According to another aspect of the present invention, there is provided a method of manufacturing an optical device having a micromirror, the method including: preparing a holder in which at least one micromirror unit is placed, wherein the micromirror unit includes a first substrate, a first adhesion layer, a first magnetic layer, a first bonding layer, and a mirror surface; preparing a photodiode array in which include a second magnetic layer having a magnetization direction opposite to a magnetization direction of the first magnetic layer; adhering the micromirror unit to the photodiode array by magnetic force between the first magnetic layer and the second magnetic layer; separating the holder from the magnetic unit; and bonding the micromirror unit on the photodiode array; and cutting the photodiode array according to unit optical devices.

The preparing of the holder may include: forming the first adhesion layer on the first substrate and the first magnetic layer on the first adhesion layer; patterning the first adhesion layer and the first magnetic layer; magnetizing the first magnetic layer; forming the first bonding layer on each side of the first adhesion layer and first magnetic layer; severing the first substrate into each unit including the first adhesion layer, the first magnetic layer, and the first bonding layer; forming a mirror surface on a side of the cut substrate to form the micromirror unit; and placing the micromirror unit in a holder having a plurality of grooves.

The preparing a photodiode array may include: forming a plurality of grooves on a second substrate; forming a second adhesion layer on the second substrate and the second magnetic layer on the second adhesion layer; patterning the second adhesion layer and the second magnetic layer; magnetizing the second magnetic layer in a direction opposite to a magnetization direction of the first magnetic layer; and forming a second bonding layer on each side of the second adhesion layer and the second magnetic layer.

BRIEF DESCRIPTION OF THE DRAWINGS

The above aspects and advantages of the present invention will become more apparent by describing in detail exemplary embodiments thereof with reference to the attached drawings in which.

DETAILED DESCRIPTION OF ILLUSTRATIVE, NON-LIMITING EMBODIMENTS OF THE INVENTION

Exemplary embodiments of the invention will now be described below with reference to the attached Figures. The described exemplary embodiments are intended to assist the understanding of the invention, and are not intended to limit the scope of the invention in any way.

FIGS. 2A through 2G illustrate a method of manufacturing a micromirror array according to an exemplary embodiment of the present invention.

Figure 1A:
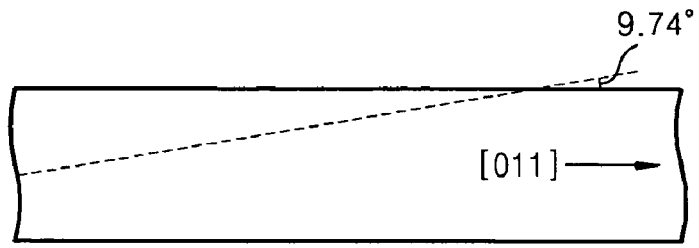
FIGS. 1A through 1E illustrate a conventional method of manufacturing a micromirror using semiconductor processes.
Figure 1B:
Figure 1C:
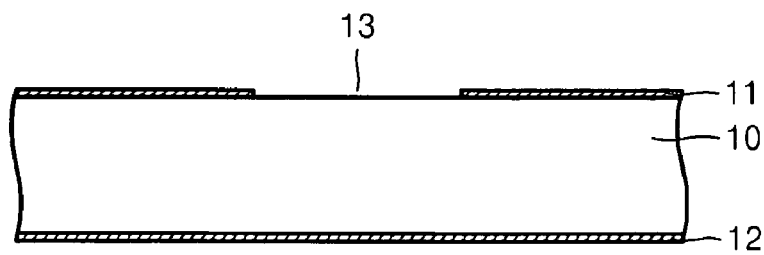
Figure 1D:
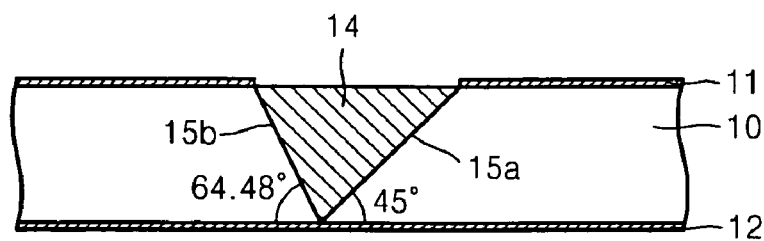
Figure 1E:
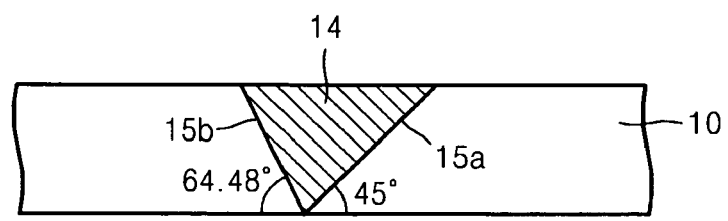
Figure 2A:
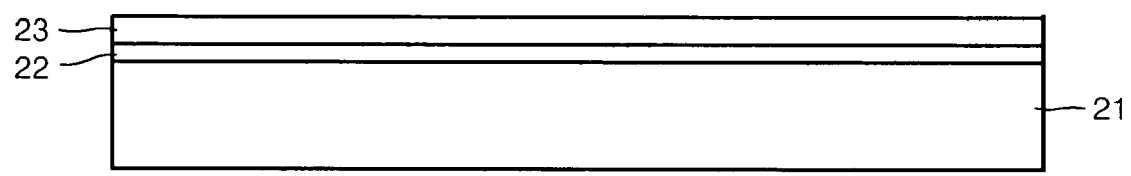
FIGS. 2A through 2G illustrate a structure and a method of manufacturing a micromirror array according to an exemplary embodiment of the present invention.

Referring to FIG. 2A, an adhesion layer 22 is formed on an Si or glass substrate 21 using processes such as sputtering, and a magnetic layer 23 is formed on the adhesion layer 22. The adhesion layer 22 is formed of a material, for example, Ta, Ca, Ru, Ti or Pt so that the magnetic layer 23 formed on the adhesion layer 22 is well attached to the substrate 21. The magnetic layer 23 may be formed of a ferromagnetic material, for example, CoSm, CoPt, NiFe, NdFeB, or FePt.

Figure 2B:
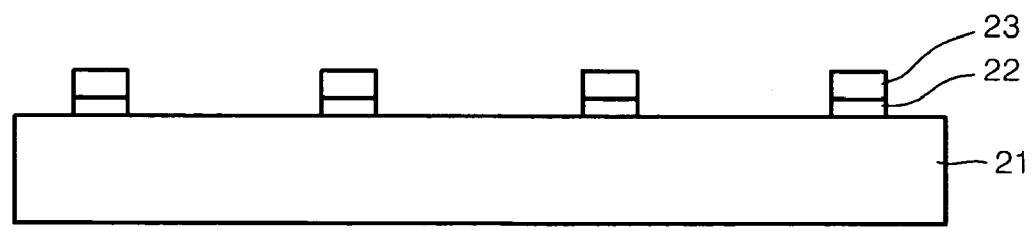

Referring to FIG. 2B, processes such as photolithography and reactive ion etching (RIE), ion milling or wet etching are performed on the adhesion layer 22 and the magnetic layer 23 so that a portion of the substrate 21 is exposed. In this case, the adhesion layer 22 and the magnetic layer 23 remain in the substrate 21 at uniform intervals. Each pattern of the fixing layer 22 and the magnetic layer 23 corresponds to one unit microarray-forming region. In this case, an etching region and an etching width can be arbitrarily adjusted.

Figure 2C:
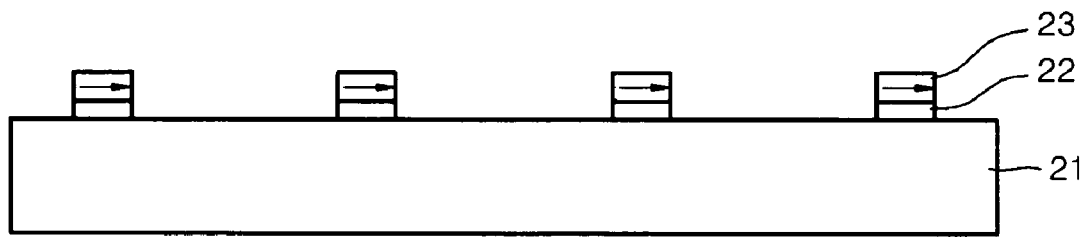

Referring to FIG. 2C, the magnetization direction of the magnetic layer 23 in each pattern of the adhesion layer 22 is aligned in a predetermined direction. To this end, the magnetic layer 23 may be aligned using a magnetizer. The magnetization direction of the magnetic layer 23 is aligned in a predetermined direction so that a micromirror array and a photodiode (PD) array can be easily bonded to each other, which will be described later.

Figure 2D:
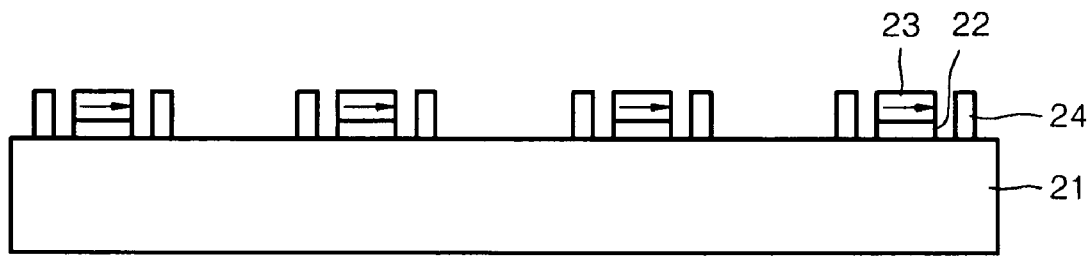

Referring to FIG. 2D, a bonding layer 24 is formed on each side of the adhesion layer 22 and the magnetic layer 23. The bonding layer 24 is formed using metal, for example, Ti/Au. Specifically, a photoresist (PR) is coated on the substrate 21, the adhesion layer 22, and the magnetic layer 23, thereby forming a PR layer. A photomask in which a location where the bonding layer 24 is to be formed is placed on the substrate 21, and light is irradiated from an upper portion of the photomask, thereby performing a photolithography process. Then, the photomask is removed and the PR layer is developed so that the PR layer of the location 21 where the bonding layer 24 is to be formed is removed. Metal such as Ti/Au is deposited using sputtering or E-beam evaporation, thereby being filled in the location where the bonding layer 24 is to be formed. Next, the photoresist is removed using a lift-off process to separate the PR layer so that the bonding layer 24 is formed on each side of the adhesion layer 22 and the magnetic layer 23, as shown in FIG. 2D.

Figure 2E:
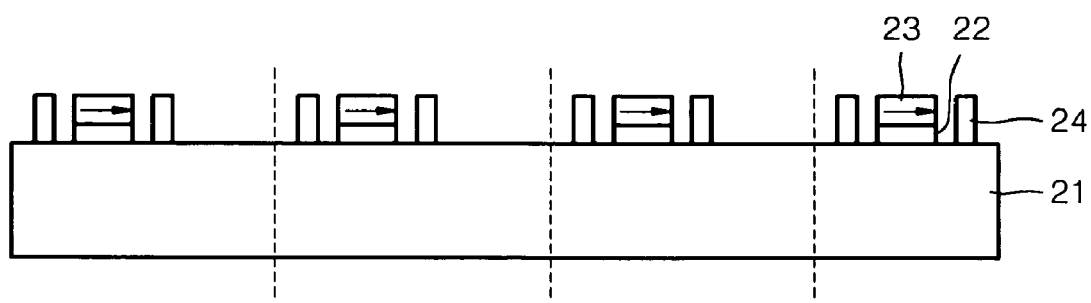

Referring to FIG. 2E, a dicing process is performed based on a dotted region. That is, the substrate 21 is separated from a structure in which the bonding layer 24 is formed on each side of the adhesion layer 22 and the magnetic layer 23.

Figure 2F:
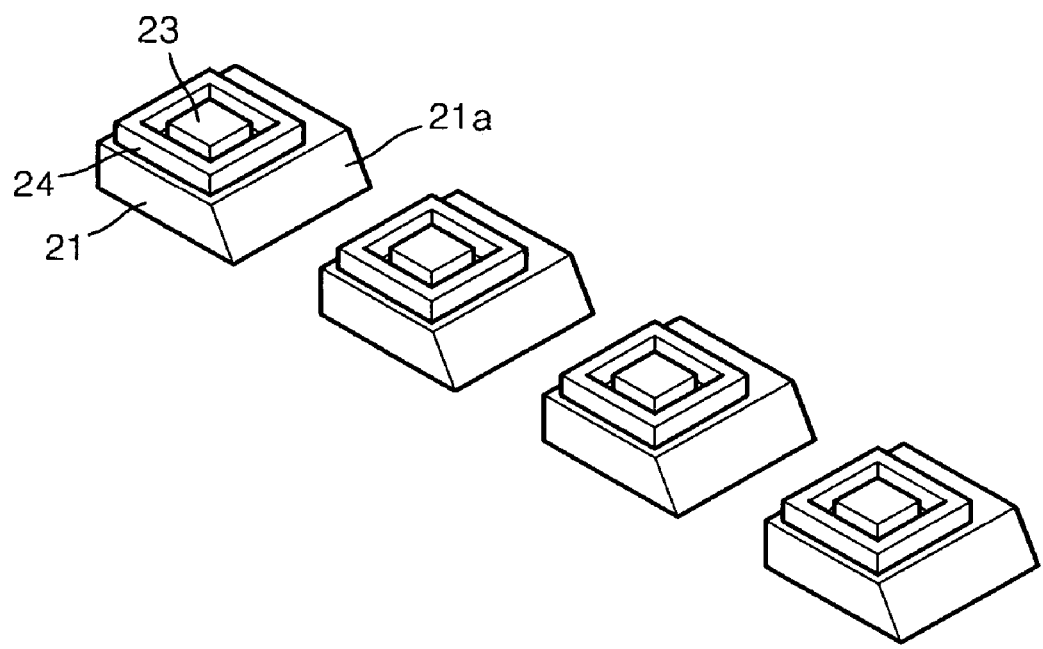

Referring to FIG. 2F, a first mirror surface 21a is formed on a side of the substrate 21 using polishing. The first mirror surface 21a may be formed by adjusting an inclined angle according to the purpose or use of the mirror surface 21a. For example, when the first mirror surface 21a is used in an optical pickup, an inclined angle of about 45 and 64.48 degrees is needed and thus, polishing is performed. As such, a plurality of unit micromirrors can be formed. In FIG. 2F, the bonding layer 24 surrounds the adhesion layer 22 and the magnetic layer 23. The shape of the bonding layer 24 can be arbitrarily adjusted. The bonding layer 24 of the micromirror is a region which may be later bonded to a bench, for example a silicon optical bench (SiOB) at a wafer level, which will be described later.

Figure 2G:
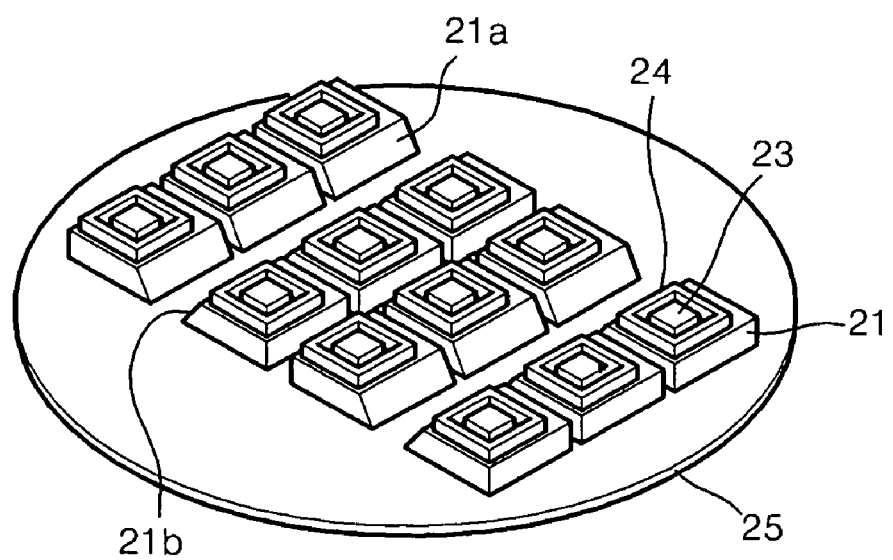

Referring to FIG. 2G, the plurality of micromirrors formed in FIGS. 2A through 2F are placed in a holder 25. In this case, the micromirrors are bonded to the holder 25, or stuck thereon. As a result, a micromirror array structure can be completed.

A method of manufacturing a photodiode (PD) which will be bonded to the above-described micromirror array will now be described with reference to FIGS. 3A through 3F.

Figure 3A:
FIGS. 3A through 3F illustrate a method of manufacturing a photodiode (PD) array according to another exemplary embodiment of the present invention.

Referring to FIG. 3A, a groove corresponding to a region to which a micromirror is to be bonded is formed in a photodiode array substrate 31 using a photolithography process and an RIE or a wet etching process.

Figure 3B:
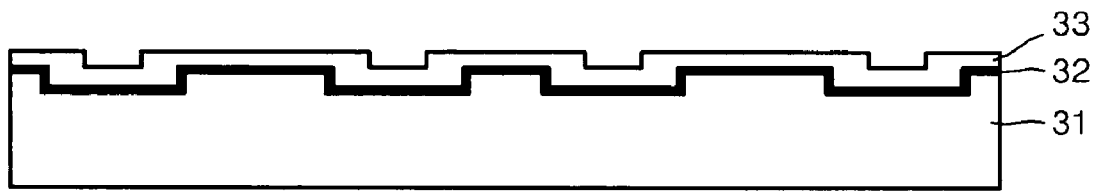

Referring to FIG. 3B, the adhesion layer 32 and the magnetic layer 33 are formed on the substrate 31. The adhesion layer 32 is formed by coating a material, for example, Ta, Cr, Ru, Ti or Pt. The magnetic layer 33 is formed by coating a ferromagnetic material, for example, CoSm, CoPt, NdFeB, NiFe or FePt.

Figure 3C:
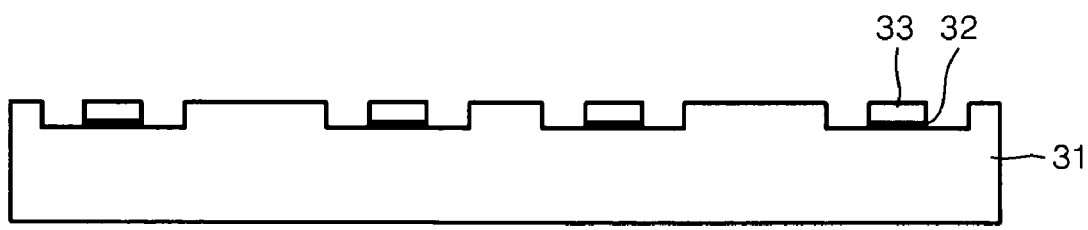

Referring to FIG. 3C, processes such as photolithography and reactive ion etching (RIE), ion milling or wet etching are performed on the adhesion layer 32 and the magnetic layer 33 so that a portion of the substrate 31 is exposed. In this case, the adhesion layer 32 and the magnetic layer 33 remain in the substrate 31 at uniform intervals. Each pattern of the adhesion layer 32 and the magnetic layer 33 corresponds to one unit micromirror illustrated in FIGS. 2A through 2G. In this case, an etching region and an etching width correspond to the size of the adhesion layer 22 and the magnetic layer 23 of the unit micromirror.

Figure 3D:
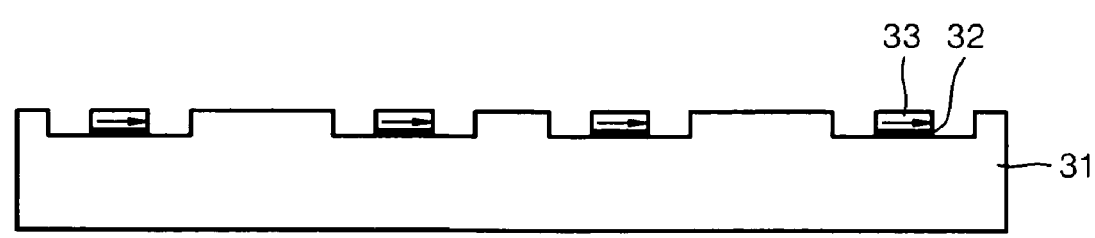

Referring to FIG. 3D, the magnetization direction of the magnetic layer 33 in each pattern of the adhesion layer 32 and the magnetic layer 33 is aligned in a predetermined direction. To this end, the magnetic layer 33 may be aligned using a magnetizer. The magnetization direction of the magnetic layer 33 is opposite to a magnetism direction of a magnetic layer 23 of the micromirror to be bonded.

Figure 3E:
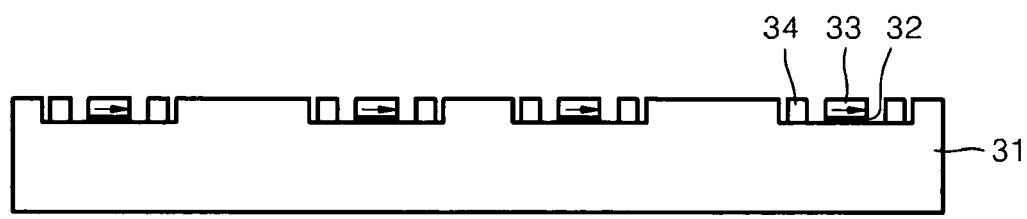

Referring to FIG. 3E, a bonding layer 34 is formed on each side of the adhesion layer 32 and the magnetic layer 33. The bonding layer 34 is formed using metal, for example, Ti/Au. The method of forming the bonding layer 34 is the same as the method of forming the bonding layer 24 illustrated in FIG. 2D.

Figure 3F:
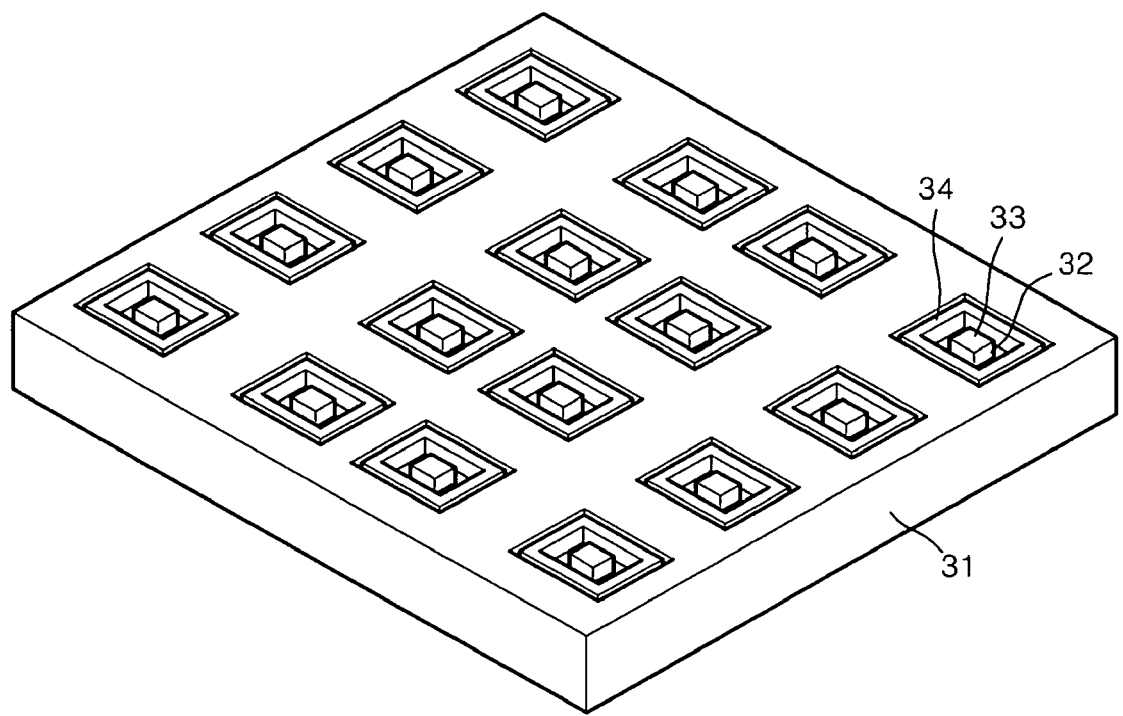

Referring to FIG. 3F, the adhesion layer 32 and the magnetic layer 33 are respectively formed in the groove of the substrate 31 and an array structure which surrounds the adhesion layer 32 and the magnetic layer 33 and in which the bonding layer 34 is formed can be seen. In FIG. 3F, the groove in which the adhesion layer 32 and the magnetic layer 33 are formed is separately formed. However, the groove can be formed in a rectangular shape that can include one row.

A method of bonding the above-described micromirror array and the PD array to each other will now be described with reference to FIGS. 4A through 4C.

Figure 4A:
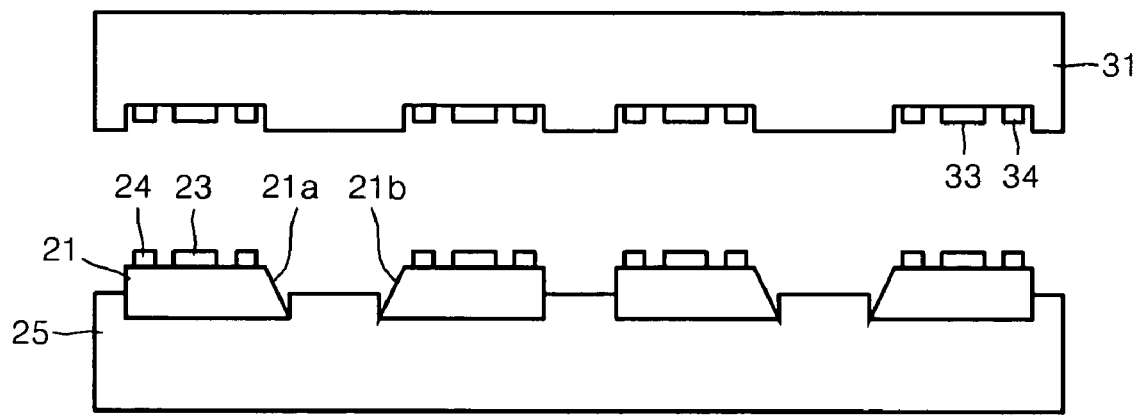
FIGS. 4A through 4C illustrate a method of aligning and bonding the micromirror array illustrated in FIGS. 2A through 2G to the PD array illustrated in FIGS. 3A through 3F.

Referring to FIG. 4A, the micromirror array in which first and second mirror surfaces 21a and 21b are formed is bonded to the PD array so that each of the magnetic layers 23 and 33 corresponds to each of the bonding layers 24 and 34. In this case, since the magnetic layer 23 of the micromirror array and the magnetic layer 33 of the PD array are aligned in opposite magnetization directions, an attractive force acts thereon. Due to the magnetic layers 23 and 33 having opposite polarities, the attractive force acts thereon so that the micromirror array and the PD array are bonded to each other with high precision less than submicrons.

Figure 4B:
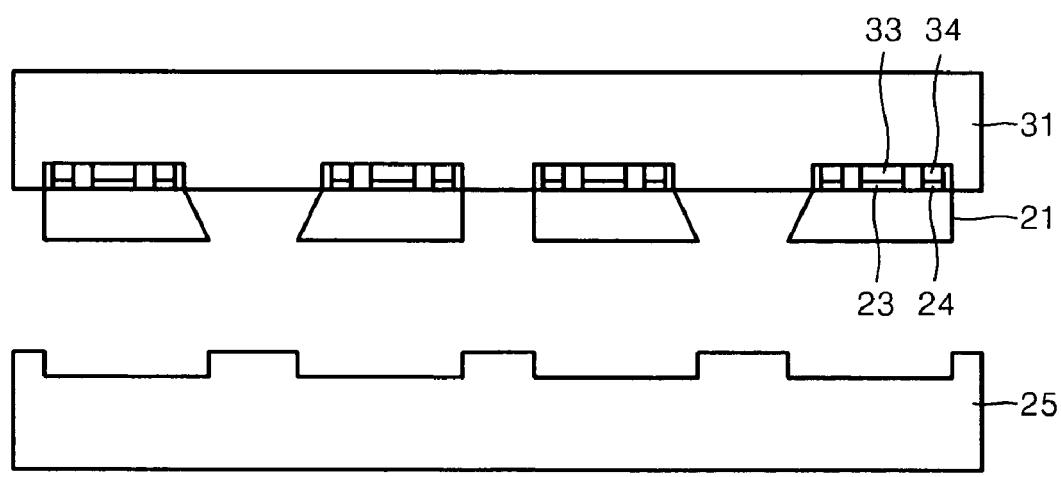
Figure 4C:
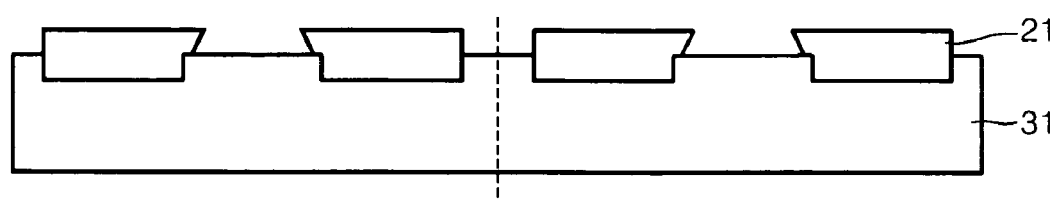

Referring to FIG. 4B, the holder 25 in which the substrate 21 having the first and second mirror surfaces 21a and 21b has been placed is separated. Referring to FIG. 4C, each micromirror is fixed to the PD array using a magnetic force. Next, pressure and heat are applied so as to permanently bond the micromirror and the substrate 31 to each other, so that they are eutectic bonded. By performing a dicing process on the micromirror array of FIG. 4C, a unit optical device can be obtained.

Figure 5:
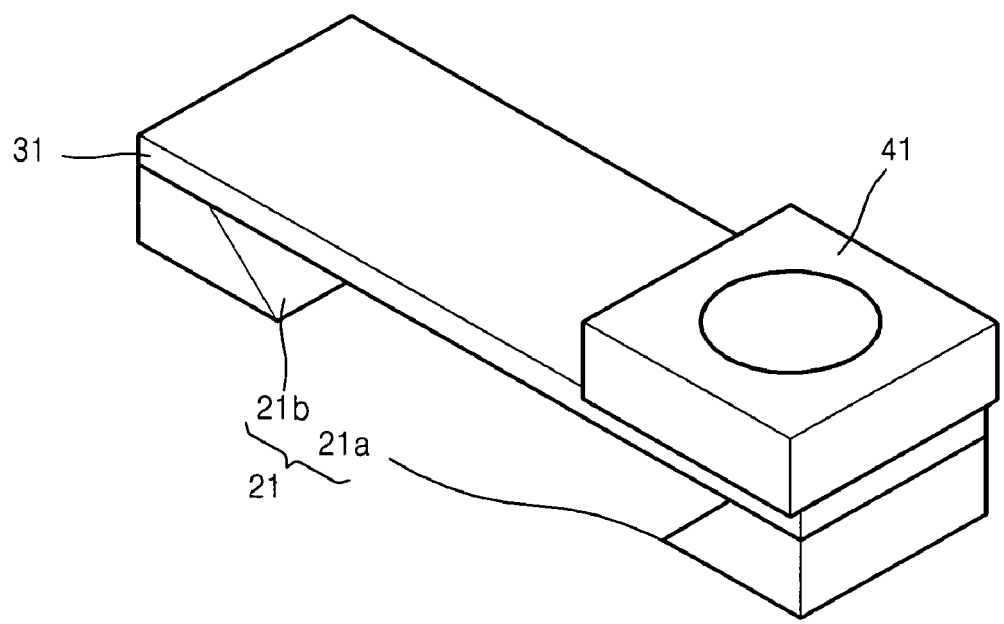
FIGS. 5 and 6 show an optical pickup in which a micromirror array is bonded to an SiOB at a wafer level and formed.
Figure 6:
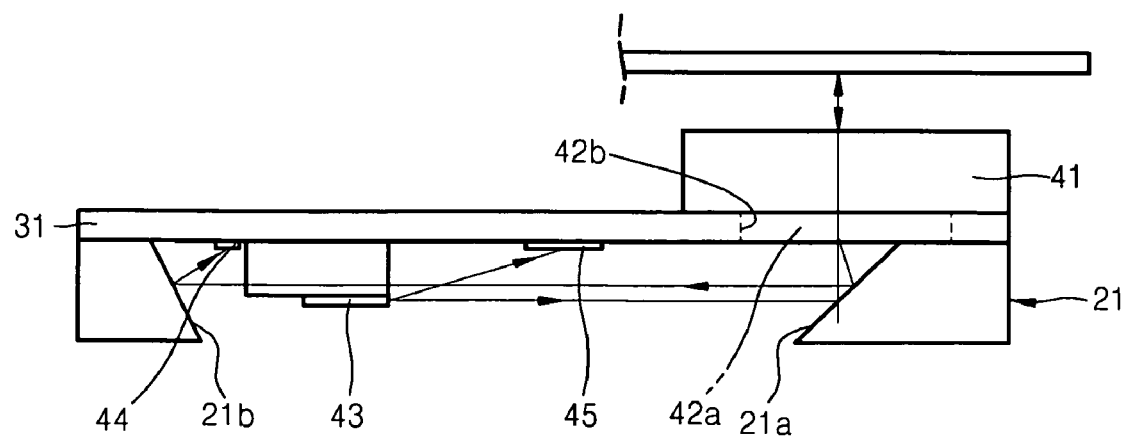

FIGS. 5 and 6 show a structure of an optical pickup in which a micromirror array is bonded to an SiOB at a wafer level and formed. Referring to FIGS. 5 and 6, the optical pickup includes first and second mirror surfaces 21a and 21b formed on one side of the substrate 31 which is an optical bench. The first mirror surface 21a is disposed on one side of the substrate 31, and on the first mirror surface 21a, light emitted from the light source of the mount unit 43 is reflected by a light-passing hole 42b and incident into an information storage medium. The second mirror surface 21b is disposed on another side of the substrate 31, and on the second mirror surface 21b, reflected light transmitted from the first mirror surface 21a is incident into a main photodetector 44.

The main photodetector 44 receives light reflected from the information storage medium and detects an information reproduction signal such as an RF signal and an error signal such as a focusing error signal, a tracking error signal, or a tilting error signal used in servo driving. A monitor photodetector 45 directly receives a portion of the light emitted from the light source of the mount unit 43 and generates a monitoring signal using the amount of light.

A light-path separating unit 42a separates a path of light emitted from the light source of the mount unit 43 and incident into the information storage medium and a path of light reflected from the information storage medium from each other. A diffractive optical element such as a hologram optical element (HOE) or a diffractive optical element (DOE) can be used as the light-path separating unit 42a.

The operation of the optical pickup will now be described. Light emitted from the light source of the mount unit 43 is reflected from the first mirror surface 21a of a micromirror and is incident into an information storage medium such as a CD through the light-passing hole 42b. The light reflected from the information storage medium is incident into the first mirror surface 21a of the micromirror through the light-passing hole 42b. The light reflected from the first mirror surface 21a is incident into the second mirror surface 21b and received by the main photodetector 44. Thus, the micromirror should be precisely bonded to an SiOB so as to precisely control a light path. The micromirror array according to an exemplary embodiment of the present invention is formed in consideration of an alignment surface and can satisfy precision of an optical element such as an optical pickup.

According to the exemplary embodiment of the present invention, the following advantages can be obtained. First, a micromirror array and a photodiode (PD) array can be easily bonded to each other by adjusting the magnetization arrangement of a ferromagnetic layer without the need of forming a separate alignment key. Second, the micromirror array can be manufactured to have high productivity at a wafer level, and each mirror surface is separately formed such that a process time is very short compared to a conventional method of manufacturing a micromirror array using wet etching. Third, when a conventional micromirror is manufactured using a semiconductor process, the requirement of an optical element using a wavelength having low surface precision of a mirror surface cannot be satisfied. However, according to the exemplary embodiment of the present invention, precision of a unit micromirror can be controlled such that the micrrormirror can be used in a Blu-ray optical disc system or the like.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method of manufacturing a micromirror array comprising:
   forming an adhesion layer on a substrate and a magnetic layer on the adhesion layer;
   patterning the adhesion layer and the magnetic layer;

magnetizing the magnetic layer;

forming a bonding layer near sides of the adhesion layer and the magnetic layer;

severing the substrate into units, each unit including at least a portion of the adhesion layer, the magnetic layer, and the bonding layer;

forming a mirror surface on a side of the substrates of the units to form unit micromirror structures; and placing the unit micromirror structures in a holder to form a micromirror array.

2. The method of claim 1, wherein the substrate is an Si substrate or a glass substrate.

3. The method of claim 1, wherein the adhesion layer includes at least one material among Ta, Cr, Ru, Ti, and Pt.

4. The method of claim 1, wherein the magnetic layer includes at least one material among CoSm, CoPt, NdFeB, NiFe or FePt.

5. The method of claim 1, wherein the holder includes at least one groove and the unit micromirror structures are placed in the at least one groove.

6. A method of manufacturing an optical device having a micromirror, the method comprising:

preparing a holder in which at least one micromirror unit is placed, wherein the micromirror unit includes a first substrate, a first adhesion layer, a first magnetic layer, a first bonding layer, and a mirror surface;

preparing a photodiode array including a second magnetic layer having a magnetization direction opposite to a magnetization direction of the first magnetic layer;

adhering the micromirror unit to the photodiode array by magnetic force between the first magnetic layer and the second magnetic layer;

separating the holder from the micromirror unit;

bonding the micromirror unit on the photodiode array; and cutting the photodiode array to form unit optical devices.

7. The method of claim 6, wherein preparing the at least one micromirror unit comprises:

forming the first adhesion layer on the first substrate and the first magnetic layer on the first adhesion layer;

patterning the first adhesion layer and the first magnetic layer;

magnetizing the first magnetic layer;

forming the first bonding layer on each side of the first adhesion layer and the first magnetic layer;

severing the first substrate into at least one unit, each unit including at least a portion of the first adhesion layer, the first magnetic layer, and the first bonding layer; and forming a mirror surface on a side of the substrate of the at least one unit to form the micromirror unit.

8. The method of claim 6, wherein preparing the photodiode array comprises:

forming a plurality of grooves on a second substrate;

forming a second adhesion layer on the second substrate and the second magnetic layer on the second adhesion layer;

patterning the second adhesion layer and the second magnetic layer;

magnetizing the second magnetic layer in the direction opposite to the magnetization direction of the first magnetic layer; and forming a second bonding layer near sides of the second adhesion layer and the second magnetic layer.

9. The method of claim 8, wherein the first or second substrate is an Si substrate or a glass substrate.

10. The method of claim 8, wherein the first or second adhesion layer includes at least one material among Ta, Cr, Ru, Ti, and Pt.

11. The method of claim 8, wherein the first or second magnetic layer includes at least one material among CoSm, CoPt, NdFeB, NiFe or FePt.

* * * * *

UNITED STATES PATENT AND TRADEMARK OFFICE
CERTIFICATE OF CORRECTION

PATENT NO. : 7,372,618 B2 Page 1 of 1
APPLICATION NO. : 11/353964
DATED : May 13, 2008
INVENTOR(S) : Yun-woo Nam et al.

It is certified that error appears in the above-identified patent and that said Letters Patent is hereby corrected as shown below:

Title Page, Item (73) ASSIGNEE, should read

SAMSUNG ELECTRO-MECHANICS CO., LTD

Signed and Sealed this

Ninth Day of February, 2010

David J. Kappos
*Director of the United States Patent and Trademark Office*